(12) United States Patent
Sakamoto et al.

(10) Patent No.: US 7,335,445 B2
(45) Date of Patent: Feb. 26, 2008

(54) POSITIVE ELECTRODE ACTIVE MATERIAL FOR ALKALINE STORAGE BATTERY, POSITIVE ELECTRODE AND ALKALINE STORAGE BATTERY

(75) Inventors: Hiroyuki Sakamoto, Toyohashi (JP); Hidekatsu Izumi, Katano (JP); Yoichi Izumi, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 547 days.

(21) Appl. No.: 10/313,824

(22) Filed: Dec. 6, 2002

(65) Prior Publication Data
US 2003/0108792 A1   Jun. 12, 2003

(30) Foreign Application Priority Data
Dec. 7, 2001   (JP) .............................. 2001-373755

(51) Int. Cl.
  *H01M 4/00* (2006.01)
(52) U.S. Cl. .................. 429/223; 429/209; 429/231.6; 429/231.3
(58) Field of Classification Search ................ 429/223, 429/231.95, 209, 231.6, 231.3
See application file for complete search history.

(56) References Cited

U.S. PATENT DOCUMENTS

| | | | |
|---|---|---|---|
| 6,013,390 A * | 1/2000 | Kimiya et al. | 429/206 |
| 6,083,642 A * | 7/2000 | Kato et al. | 429/218.1 |
| 6,358,648 B2 * | 3/2002 | Hayashi et al. | 429/223 |
| 6,521,377 B2 | 2/2003 | Ogasawara et al. | |
| 6,800,396 B1 * | 10/2004 | Stoller et al. | 429/223 |

FOREIGN PATENT DOCUMENTS

| | | |
|---|---|---|
| JP | 02-109261 A | 4/1990 |
| JP | 05-021064 A | 1/1993 |
| JP | 05-041212 A | 2/1993 |
| JP | 05-182662 A | 7/1993 |
| JP | 05-182663 A | 7/1993 |
| JP | 11-219703 A | 8/1999 |
| JP | 11-238509 | 8/1999 |
| JP | 2000-133302 | 5/2000 |
| JP | 2001-185137 | 7/2001 |
| WO | WO0052988 | * 9/2000 |

* cited by examiner

*Primary Examiner*—Jane Rhee
(74) *Attorney, Agent, or Firm*—Akin Gump Strauss Hauer & Feld LLP (57) ABSTRACT

A particulate positive electrode active material for an alkaline storage battery comprising: (a) solid solution nickel hydroxide particles containing at least magnesium and (b) a coating layer comprising cobalt oxide being formed on the surface of the solid solution nickel hydroxide particles. The amount of magnesium contained in the solid solution nickel hydroxide particles (a) is not smaller than 2 mol % and not larger than 15 mol % of the total amount of metal elements contained in the solid solution nickel hydroxide particles (a). BET specific surface area of the solid solution nickel hydroxide particles (a) measured by nitrogen gas adsorption is not smaller than 5 $m^2/g$ and not larger than 15 $m^2/g$. The coating layer (b) further comprises at least one element Xs selected from the group consisting of yttrium, ytterbium, lutetium, titanium and calcium.

11 Claims, 4 Drawing Sheets

FIG. 1

Percentage by weight of cobalt hydroxide amount to solid solution nickel hydroxide particles amount (wt%)

FIG. 2

Percentage by mole of yttrium amount to total amount of cobalt and yttrium in coating layer (mol%)

BET specific surface area (m²/g)

FIG. 6

Percentage by weight of sulfate ion amount in solid solution nickel hydroxide particles (wt%)

FIG. 7

Percentage by mole of lithium hydroxide amount to total amount of alkali metal hydroxides in alkaline electrolyte (mol%)

POSITIVE ELECTRODE ACTIVE MATERIAL FOR ALKALINE STORAGE BATTERY, POSITIVE ELECTRODE AND ALKALINE STORAGE BATTERY

BACKGROUND OF THE INVENTION

In recent years, positive electrodes for alkaline storage batteries have been improved to have an increasingly improved capacity density by means of the improvements of substrate form, type of active material, composition of active material and additives. Positive electrodes having a capacity density of about 600 mAh/cc are currently in practical use. However, devices which use alkaline storage batteries as their power sources require for the batteries to have more improved high-rate discharge characteristics and more enhanced output. In order to improve the high-rate discharge characteristics, the methods to improve the current-collecting efficiency of the electrode, to reduce the resistance of the electrode and to enhance the charge/discharge efficiency of the active material have been investigated. The method to replace nickel contained in nickel hydroxide with other metals so as to reform nickel hydroxide has also been examined.

Since a solid solution nickel hydroxide containing a small amount of magnesium has high discharge potential, its application to an electrode material has been examined. If the discharge potential is shifted to noble direction, the battery output will be increasingly improved. The use of a solid solution nickel hydroxide containing a small amount of magnesium as the positive electrode active material improves the battery's cycle life because the production of $\gamma$-NiOOH is suppressed.

The following are proposed examples of a solid solution nickel hydroxide containing a small amount of magnesium.

(1) Japanese Laid-Open Patent Publication No. Hei 2-109261 proposes a solid solution nickel hydroxide containing 1 to 3 wt % of magnesium, in which the total volume of micropores with a diameter of 30 Å or less is 0.05 ml/g or less, to be used as the positive electrode active material. This prior art example is intended to obtain high-density nickel hydroxide powder, to prevent the production of $\gamma$-NiOOH by the addition of magnesium, and to improve the active material utilization rate.

(2) Japanese Laid-Open Patent Publication No. Hei 5-21064 proposes a mixture of spherical or sphere-like particles and non-spherical particles to be used as the positive electrode active material, in which 1 to 7 wt % of magnesium or the like of the amount of nickel hydroxide powders is added during the production of the positive electrode. This prior art example is intended to improve the packing density of nickel hydroxide when it is filled into the positive electrode, to prevent the production of $\gamma$-NiOOH during overcharge by adding magnesium or the like, and to improve the battery's cycle life.

(3) Japanese Laid-Open Patent Publication No. Hei 5-41212 proposes a nickel hydroxide containing 1 to 7 wt % of magnesium or the like of the amount of nickel hydroxide powder to be used as the positive electrode active material, in which innumerable primary particles with a particle size of 0.1 μm or less are aggregated and the volume of a micropore with a diameter of 30 Å or more is 20 to 70% of the total volume of the micropores. This prior art example is intended to prevent the production of $\gamma$-NiOOH due to the uneven distribution of the electrolyte in the particles by facilitating the impregnation of the electrolyte into the particles, and to improve the active material utilization rate at the initial charge/discharge cycle. The aim of adding magnesium or the like is to improve the battery's cycle life, which is the same as that of the prior art example (2).

(4) Japanese Laid-Open Patent Publication No. Hei 5-182662 proposes a solid solution nickel hydroxide containing an additive element to be used as the positive electrode active material in which the volume of internal micropore is 0.14 ml/g or less. Examples of the additive element are Zn, Mg, Cd or Ba, all of which do not degrade the characteristics of the nickel hydroxide active material. This prior art example is intended to suppress the production of $\gamma$-NiOOH by forming defects in the crystal lattice of nickel hydroxide as well as increasing the mobility of protons in the high-density nickel hydroxide powders in which the volume of the internal micropore is small, and to improve the battery's cycle life.

(5) Japanese Laid-Open Patent Publication No. Hei 5-182663 proposes a solid solution nickel hydroxide containing Co and other additive elements, in which the volume of an internal micropore is 0.14 ml/g, to be used as the positive electrode active material. Examples of the additive element are Zn, Mg, Cd or Ba. This prior art example is intended to improve the high temperature charge efficiency, to suppress the production of $\gamma$-NiOOH, and to enhance the battery's cycle life.

(6) Japanese Laid-Open Patent Publication No. Hei 11-219703 proposes, as the positive electrode active material, composite particles comprising: solid solution nickel hydroxide particles containing 0.5 wt % to 5 wt % of magnesium of the amount of nickel; and a coating layer containing sodium and cobalt compound formed on the solid solution nickel hydroxide particles. It is also proposed that yttrium metal and/or yttrium compound in an amount of 0.05 to 5.0 wt %, in yttrium percentage, of the nickel amount in the nickel hydroxide particle is/are added to the positive electrode. This prior art example is intended to suppress the production of $\gamma$-NiOOH, to improve the battery's cycle life, and to enhance the charge efficiency by providing a coating layer containing sodium and cobalt compound, and yttrium.

Therefore, all of the prior art examples (1) through (6) are intended to improve the charge/discharge efficiency and the battery's cycle life.

The problem arises, however, that the utilization rate of a solid solution nickel hydroxide containing magnesium tends to decrease during high rate discharge. This is because, when the solid solution nickel hydroxide is synthesized, the growth of nickel hydroxide crystals is hindered, thereby crystal grains become smaller to increase the specific surface area. If the specific surface area is increased, the electrolyte will be excessively absorbed into the positive electrode to reduce the amount of electrolyte in the separator or the negative electrode. Due to the increased specific surface area of nickel hydroxide, the coating layer composed of cobalt oxide grows unevenly to make the crystals of cobalt oxide nonuniform, resulting in reduction of the conductivity of the active material. As a result, the polarization during high rate discharge becomes larger and the active material utilization rate is decreased.

Another problem arises that a solid solution nickel hydroxide containing magnesium has a significantly reduced charge efficiency in high temperatures. This is because the solid solution nickel hydroxide containing magnesium has not only an increased discharge potential but also an increased charge potential; therefore, the oxygen evolution reaction is likely to proceed at the end of charging.

Accordingly, even if batteries are produced according to the prior art examples (1) to (6), they will not have satisfactory high rate charge/discharge characteristics and will not excel in high temperature charge efficiency. According to the prior art example (5), charge efficiency will be slightly improved because the charge potential is reduced due to the lowering of the potential of the electrode comprising nickel hydroxide containing cobalt. However, the effect of improving charge efficiency is poor, and when a solid solution nickel hydroxide containing magnesium with a high charge potential is used as the positive electrode active material, it is impossible to raise the charge efficiency to the required level. According to the prior art example (6), the charge efficiency will be improved because the addition of yttrium metal or yttrium compound to the positive electrode increases the oxygen generating overvoltage at the end of charging. When the solid solution nickel hydroxide contains a large amount of magnesium, however, the charge potential will be significantly increased; therefore, it is difficult to achieve a required high level of charge efficiency.

In addition to the above, the prior art examples (1) to (6) are not intended to produce a battery of a greater output by utilizing a high discharge potential of a solid solution nickel hydroxide containing magnesium.

BRIEF SUMMARY OF THE INVENTION

According to the present invention, it is possible to obtain, for instance, a positive electrode active material for an alkaline storage battery with a high discharge potential and a greater output which excels in high-rate discharge characteristic and high temperature charge efficiency.

The present invention relates to a particulate positive electrode active material for an alkaline storage battery comprising: (a) solid solution nickel hydroxide particles containing at least magnesium and (b) a coating layer comprising cobalt oxide being formed on the surface of the solid solution nickel hydroxide particles.

The amount of magnesium contained in the solid solution nickel hydroxide particles (a) is not smaller than 2 mol % and not larger than 15 mol % of the total amount of metal elements contained in the solid solution nickel hydroxide particles (a).

BET specific surface area of the solid solution nickel hydroxide particles (a) measured by nitrogen gas adsorption is not smaller than 5 $m^2/g$ and not larger than 15 $m^2/g$.

The coating layer (b) further comprises at least one element "Xs" selected from the group consisting of yttrium, ytterbium, lutetium, titanium and calcium.

The amount of the coating layer (b) contained in the particulate active material is preferably not smaller than 3 wt % and not larger than 15 wt % of the amount of the solid solution nickel hydroxide particles (a).

The amount of the element "Xs" contained in the coating layer (b) is preferably not smaller than 2 mol % and not larger than 20 mol % of the total amount of metal elements contained in the coating layer (b).

The average valence of cobalt in the cobalt oxide is preferably greater than 3.

Preferably, the solid solution nickel hydroxide particles (a) contain sulfate ions in an amount of 0.5 wt % or less.

Preferably, the solid solution nickel hydroxide particles (a) further comprise at least one element "Xc" selected from the group consisting of cobalt and manganese.

The amount of the element "Xc" contained in the solid solution nickel hydroxide particles (a) is preferably not smaller than 0.5 mol % and not larger than 3 mol % of the total amount of metal elements contained in the solid solution nickel hydroxide particles (a).

The present invention further relates to a positive electrode for an alkaline storage battery comprising the above-mentioned particulate positive electrode active material.

The present invention still further relates to an alkaline storage battery comprising: (1) a positive electrode comprising the above-mentioned particulate positive electrode active material; (2) a negative electrode; and (3) an alkaline electrolyte containing alkali metal ions.

The concentration of the alkali metal ions contained in the alkaline electrolyte (3) is preferably not smaller than 5 mol/L and not larger than 9 mol/L.

The alkaline electrolyte (3) preferably contains lithium hydroxide.

The amount of lithium ions contained in the alkaline electrolyte (3) is preferably not smaller than 5 mol % and not larger than 25 mol % of the total amount of the alkali metal ions contained in the alkaline electrolyte (3).

While the novel features of the invention are set forth particularly in the appended claims, the invention, both as to organization and amount, will be better understood and appreciated, along with other objects and features thereof, from the following detailed description taken in conjunction with the drawings.

DETAILED DESCRIPTION OF THE INVENTION

A particulate active material of the present invention comprises (a) solid solution nickel hydroxide particles containing at least magnesium and (b) a coating layer comprising cobalt oxide formed on the surface of the particles (a).

Desirably, the coating layer comprising cobalt oxide is uniformly provided, adhered or deposited to the surface of the solid solution nickel hydroxide particles, but the surface of the solid solution nickel hydroxide particles is not necessarily covered by the coating layer completely.

When cobalt oxide is added into a positive electrode, the cobalt oxide functions as the conductive agent in the positive electrode, thereby improving charge/discharge characteristics of the battery. When cobalt oxide is added to the surface of nickel hydroxide particles, current collecting efficiency is improved; therefore, the high-rate discharge characteristic is further enhanced.

The amount of magnesium contained in the solid solution nickel hydroxide particles is not smaller than 2 mol % and not larger than 15 mol % of the total amount of metal elements contained in the solid solution nickel hydroxide particles.

The solid solution nickel hydroxide can be obtained by replacing part of nickel atoms constituting nickel hydroxide crystals with a different kind of element. When magnesium is used as the different kind of element, the discharge potential of nickel hydroxide is increased; therefore, a battery of a great power can be obtained.

If the amount of magnesium is less than 2 mol %, the effect of enhancing the discharge potential of nickel hydroxide will be poor. On the contrary, if the amount of magnesium is greater than 15 mol %, a sufficient battery capacity cannot be obtained as well as the active material utilization rate is decreased even during low rate discharge because the amount of nickel causing a charge/discharge reaction is reduced.

Since, in the present invention, the specific surface area of solid solution nickel hydroxide particles and the element to be added to the coating layer comprising cobalt oxide are optimized, which will be described later, it is possible to obtain sufficient battery characteristics even if the solid solution contains relatively large amount of magnesium. In other words, the present invention is also effective when the amount of magnesium contained in solid solution nickel hydroxide particles is not smaller than 5 mol % and not larger than 15 mol %, further not smaller than 7 mol % and not larger than 15 mol % of the total amount of metal elements contained in the solid solution nickel hydroxide.

The amount of coating layer comprising cobalt oxide included in the particulate active material is preferably not smaller than 3 wt % and not larger than 15 wt % of the amount of solid solution nickel hydroxide particles. If the amount of coating layer is less than 3 wt %, the effect of improving high-rate discharge characteristic will be small. On the contrary, if the amount of coating layer is greater than 15 mol %, the coating layer tends to exfoliate and the current-collecting efficiency will be decreased, resulting in lower high-rate discharge characteristic. Further, if the amount of coating layer is too much, a sufficient battery capacity cannot be obtained because the percentage of nickel hydroxide in the positive electrode will decrease.

The coating layer comprising cobalt oxide further comprises at least one element "Xs" selected from the group consisting of yttrium, ytterbium, lutetium, titanium and calcium. It is possible to increase the oxygen generating overvoltage at the end of charging by adding the element "Xs" into the coating layer comprising cobalt oxide.

When solid solution nickel hydroxide containing magnesium is used as a positive electrode active material, the charge potential is increased so that the charge acceptance characteristic is decreased unless the oxygen generating overvoltage is significantly increased. In order to sufficiently improve the charge efficiency, it is necessary to add the element "Xs", which has the effect of increasing the oxygen generating overvoltage, into the coating layer comprising cobalt oxide. The reason for the significant increase of the oxygen generating overvoltage is because the element "Xs" is uniformly distributed on the coating layer comprising cobalt oxide where the charge reaction takes place.

It should be noted that it is difficult to improve the charge efficiency of solid solution nickel hydroxide containing magnesium by a conventional way of only adding yttrium metal or yttrium compound into the positive electrode.

The amount of the element "Xs" contained in the coating layer comprising cobalt oxide is preferably not smaller than 2 mol % and not larger than 20 mol % of the total amount of the metal elements contained in the coating layer. If the amount of the element "Xs" is less than 2 mol %, the effect of enhancing the high temperature charge efficiency will be poor because the oxygen generating overvoltage is hardly increased. On the other hand, if it is greater than 20 mol %, the discharge reaction is hindered to decrease the high-rate discharge characteristic.

The average valence of cobalt in the cobalt oxide is preferably greater than 3. This is because the electrical conductivity of cobalt oxide is significantly improved to further enhance the high-rate discharge characteristic.

The coating layer comprising cobalt oxide tends to be bulky (large in volume) because the growth of cobalt oxide crystals is hindered due to the inclusion of a metal element other than cobalt in the coating layer. The bulky coating layer comprising cobalt oxide causes various problems such as a low electrical conductivity and a poor current collecting efficiency by the physical exfoliation of the coating layer.

Therefore, in the present invention, cobalt oxide crystals forming the coating layer are made uniform by optimizing the specific surface area of solid solution nickel hydroxide particles containing magnesium. Specifically, the BET specific surface area of solid solution nickel hydroxide particles measured by nitrogen gas adsorption is not smaller than 5 $m^2/g$ and not larger than 15 $m^2/g$ in the present invention. When the BET specific surface area is within this range, the current collecting efficiency is not reduced by the physical exfoliation of the coating layer because the bulky coating layer having low electrical conductivity is not produced. If the specific surface area of solid solution nickel hydroxide particles is larger than 15 $m^2/g$, the coating layer comprising cobalt oxide containing the evenly dispersed element "Xs" cannot be formed uniformly on the surface of the solid solution nickel hydroxide particles. This results in a bulky active material. In addition, if the specific surface area of solid solution nickel hydroxide particles is larger than 15 $m^2/g$, the polarization during high rate discharge becomes larger and the active material utilization rate is decreased.

However, solid solution nickel hydroxide particles containing magnesium tend to have a larger specific surface area because magnesium hinders the growth of nickel hydroxide crystals during synthesis. According to the investigations of the present inventors, in order to reduce the specific surface area of solid solution nickel hydroxide particles containing magnesium, it is effective that pH of an aqueous solution in the reactor for use in synthesizing the nickel hydroxide particles is 10 to 12, which is different from conventional synthesis conditions. Alternatively, it is effective that the amount ratio of ammonia to metal ion is 2.3 to 2.9 in molar ratio when a raw material solution containing metal ions and aqueous ammonia are fed into the reactor. The amount ratio of ammonia to metal ions is usually 2 to 2.25 in molar ratio when a raw material solution and aqueous ammonia are fed into the reactor. In the present invention, therefore, it is effective to increase the ammonia concentration of a solution in the reactor as compared to a conventional method. These methods can remarkably delay the growth of the particles.

On the other hand, if the specific surface area of solid solution nickel hydroxide particles is smaller than 5 $m^2/g$, the reaction area for charging/discharging is extremely reduced, the polarization during high rate discharge becomes larger and the active material utilization rate is decreased. In addition, if the specific surface area of the solid solution nickel hydroxide particles is smaller than 5 $m^2/g$, the coating layer comprising cobalt oxide cannot be formed uniformly on the surface of the solid solution nickel hydroxide particles.

The amount of sulfate ions contained in solid solution nickel hydroxide particles is preferably 0.5 wt % or less. When magnesium is contained in nickel hydroxide, sulfate ions tend to be incorporated into the solid solution nickel hydroxide particles due to the use of sulfate salt as a raw material and the hindering of the growth of nickel hydroxide crystals. If sulfate ions are incorporated into solid solution nickel hydroxide particles, the crystal structure of nickel hydroxide tend to be disordered, the polarization during high rate discharge becomes larger and the active material utilization rate is decreased. As described above, the specific surface area of solid solution nickel hydroxide particles is optimized in the present invention; therefore, there is not much need to reduce the amount of sulfate ions contained in the solid solution nickel hydroxide particles. However, the disorder of the crystal structure of nickel hydroxide can be significantly suppressed by setting the amount of sulfate ions slightly smaller than the ordinary amount (0.55 to 0.7 wt %) contained in the solid solution nickel hydroxide particles containing magnesium.

Furthermore, solid solution nickel hydroxide particles preferably contain at least one element "Xc" selected from the group consisting of cobalt and manganese. This is because the inclusion of cobalt or manganese in the particles reduces the charge potential of the solid solution nickel hydroxide, resulting in an improved charge acceptance characteristic at the end of charging.

The amount of the element "Xc" contained in the solid solution nickel hydroxide particles is preferably not smaller than 0.5 mol % and not larger than 3 mol % of the total amount of metal elements contained in the solid solution nickel hydroxide particles. If the amount of the element "Xc" is smaller than 0.5 mol %, the effect of improving the charge acceptance characteristic at the end of charging will be poor. On the contrary, if the amount of the element "Xc" is greater than 3 mol %, the discharge potential tends to be reduced; thus, the effect of improving the output characteristic will be poor.

A positive electrode and alkaline storage battery using the positive electrode active material of the present invention can simultaneously improve discharge potential, high-rate discharge characteristic, output characteristic and high temperature charge efficiency.

An alkaline electrolyte for use in an alkaline storage battery preferably contains lithium hydroxide. Lithium hydroxide in the electrolyte significantly increases the oxygen generating overvoltage at the end of charging, resulting in a further improved high temperature charge efficiency. This effect is attributed to a larger charge density and smaller size of lithium ion than those of potassium and sodium ions.

The amount of lithium ions contained in the alkaline electrolyte is preferably not smaller than 5 mol % and not larger than 25 mol % of the total amount of alkali metal ions contained in the alkaline electrolyte. If the amount of lithium ions is smaller than 5 mol %, the oxygen generating overvoltage hardly increases; thus, the effect of improving the high temperature charge efficiency will be poor. On the other hand, if the amount of lithium ions is greater than 25 mol %, the active material utilization rate during high rate discharge will be low.

The concentration of alkali metal ions contained in an alkaline electrolyte is preferably not smaller than 5 mol/L and not larger than 9 mol/L. If the concentration is out of this range, the active material utilization rate during high rate discharge will be significantly reduced.

The following will describe the examples of the present invention.

EXAMPLE 1 i) Step 1

Solid solution nickel hydroxide particles containing magnesium were prepared.

A mixed aqueous solution A of nickel sulfate and magnesium sulfate, an aqueous solution B of sodium hydroxide and an aqueous solution C of ammonia were prepared. The total concentration of nickel sulfate and magnesium sulfate contained in the solution A was 2.4 mol/L and the concentration ratio of nickel sulfate to magnesium sulfate was 90:10 in molar ratio. The concentration of sodium hydroxide contained in the solution B was 5 mol/L. The concentration of ammonia contained in the aqueous solution C was 6 mol/L, which was higher than convention. This ammonia concentration was selected to make the specific surface area of the solid solution nickel hydroxide particles become smaller.

The solutions A, B and C were continuously fed into a reactor, which was maintained at 40° C., at a flow rate of 0.5 ml/min, respectively. The ratio of ammonia to metal ion (the total amount of nickel ions and magnesium ions) to be fed into the reactor was 2.5 in molar ratio.

Subsequently, when a steady state, where pH of the aqueous solution in the reactor became stable at 12 and the concentration of metal salts and that of the produced metal hydroxide particles were balanced, was achieved, a suspension of the hydroxide overflowed from the reactor was gathered and the hydroxide was precipitated and separated by decantation. The obtained hydroxide was immersed in an aqueous solution D of sodium hydroxide with a pH of 13 to 14 in order to remove anions in the hydroxide particles such as sulfate ions, and it was then washed with water and dried to produce solid solution nickel hydroxide particles containing magnesium with a mean particle size of 10 μm.

The amount of sulfate ions in the solid solution nickel hydroxide particles was controlled by changing the immersion time and the number of the treatment with the aqueous solution D. Specifically, the temperature of the aqueous solution D was set as high as 60° C. and the number of the immersion was increased so as to reduce the amount of sulfate ions because magnesium-containing solid solution nickel hydroxide particles tend to incorporate sulfate ions.

The magnesium-containing solid solution nickel hydroxide particles thus obtained were analyzed to determine its composition. The result was as follows.

The amount of magnesium contained in the solid solution nickel hydroxide particles was varied according to the concentration ratio of nickel sulfate to magnesium sulfate contained in the aqueous solution used for producing the particles. To be more specific, the amount of magnesium contained in the solid solution nickel hydroxide particles was 10 mol % of the total amount of the metal elements contained in the solid solution nickel hydroxide particles.

The amount of sulfate ions contained in the solid solution nickel hydroxide particles was 0.3 wt %.

The solid solution nickel hydroxide particles were confirmed to be composed of β-Ni(OH)$_2$ type single phase by X-ray diffraction pattern obtained using CuKα radiation. That is to say, it was confirmed that part of nickel atoms constituting nickel hydroxide crystals were replaced with magnesium atoms to form a solid solution.

The BET specific surface area of the solid solution nickel hydroxide particles measured by nitrogen gas adsorption was 9.8 m$^2$/g.

(ii) Step 2

A coating layer comprising cobalt oxide was formed on the solid solution nickel hydroxide particles.

A mixed aqueous solution E of cobalt sulfate and yttrium sulfate and an aqueous solution F of sodium hydroxide were prepared. The total concentration of cobalt sulfate and yttrium sulfate contained in the solution E was 2.4 mol/L and the concentration ratio of cobalt sulfate to yttrium sulfate was 90:10 in molar ratio. The concentration of sodium hydroxide contained in the solution F was 4.8 mol/L.

The solid solution nickel hydroxide particles obtained above were introduced in the solution E, and the resulting dispersion was stirred, adding an aqueous solution F gradually thereto while the temperature and the pH were maintained at 40° C. and 11.5, respectively. As a result, cobalt hydroxide containing yttrium was deposited on the surface of the solid solution nickel hydroxide particles containing magnesium. Subsequently, the particles were washed with water and dried under vacuum. The amount of cobalt hydroxide containing yttrium to be deposited on the surface of the solid solution nickel hydroxide particles was 10 wt % of that of the solid solution nickel hydroxide particles. The amount of yttrium contained in the cobalt hydroxide was 10 mol % of the total amount of cobalt and yttrium.

Thus obtained particles having a coating layer comprising cobalt hydroxide had a spherical shape, a mean particle size of 10 μm and a tap density of 1.9 g/cm$^3$.

Then, the oxidation treatment of the particles having a coating layer comprising cobalt hydroxide containing yttrium was carried out as follows. First, a proper amount of an aqueous solution of potassium hydroxide having a concentration of 45 wt % was added to the particles, which was then introduced into the dryer equipped with a heating function by means of a microwave to heat the particles while oxygen was supplied, so as to dry them out. This process changed the particle color into indigo because the coating layer comprising cobalt hydroxide formed on the particles was oxidized. The obtained powder was washed and dried under vacuum to obtain a particulate active material.

The average valence of cobalt in the coating layer was determined by iodometric titration method to be 3.3.

It is to be noted that, although the oxidation treatment in this example used an aqueous solution containing a high concentration of potassium hydroxide as an alkaline solution to be added to the powder, the use of an aqueous solution containing a high concentration of sodium hydroxide also indicated an average cobalt valence of 3.0 or more.

(iii) Step 3

Preparation of Nickel Positive Electrode

A paste prepared by mixing 100 g of the particulate active material obtained above and 27 g of water was filled into a foamed nickel substrate with a porosity of 95%, which was then dried and pressed to obtain a nickel positive electrode plate. The obtained positive electrode plate was cut into a predetermined size and an electrode lead was spot-welded thereto to form a nickel positive electrode having a theoretical capacity of 1300 mAh. It should be noted that the theoretical capacities of the nickel positive electrodes presented in this specification were calculated, given that nickel in the active material undergoes one-electron reaction.

(iv) Step 4

Production of Alkaline Storage Battery

A conventional negative electrode for an alkaline storage battery was prepared. A powder of a hydrogen storage alloy, MmNi$_{3.55}$Co$_{0.75}$Mn$_{0.4}$Al$_{0.3}$ (Mm: misch metal), with a mean particle size of 30 μm was employed. The powder was mixed with water and carboxymethyl cellulose as the binder to form a paste. This paste was filled under pressure into an electrode core member to obtain a negative electrode plate comprising a hydrogen storage alloy. This negative electrode plate was cut into a predetermined size to form a negative electrode having a capacity of 2000 mAh.

The obtained negative electrode and the aforesaid positive electrode were spirally wound with a 0.15 mm separator made of a non-woven fabric of sulfonated polypropylene interposed therebetween to form a spirally-wound electrode group. This electrode group was housed in a battery case, and 2.2 ml of an aqueous solution of potassium hydroxide with a concentration of 7 mol/L was introduced therein as the electrolyte. Thereafter, the opening of the battery case was hermetically sealed with a sealing plate equipped with a safety valve having a working pressure of about 2.0 MPa to produce a cylindrical AA size sealed nickel-metal hydride storage battery (A).

EXAMPLE 2 TO 5

Four kinds of particles having a coating layer comprising cobalt hydroxide were prepared in the same manner as EXAMPLE 1, except that, in step 2, ytterbium sulfate, lutetium sulfate, titanium sulfate and calcium nitrate were respectively used instead of yttrium sulfate. The amount of cobalt hydroxide containing ytterbium, lutetium, titanium or calcium to be deposited on the surface of the solid solution nickel hydroxide particles was 10 wt % of the amount of the solid solution nickel hydroxide particles. The amount of ytterbium, lutetium, titanium or calcium contained in the cobalt hydroxide was 10 mol % of the total amount of cobalt and, ytterbium, lutetium, titanium or calcium. The obtained particles had a spherical shape, a mean particle size of 10 μm and a tap density of 1.8 to 2.0 g/cm$^3$.

Then, the particles having a coating layer comprising cobalt hydroxide containing ytterbium, lutetium, titanium or calcium were subjected to the same oxidation treatment as EXAMPLE 1 to obtain particulate active materials having a coating layer comprising cobalt oxide containing ytterbium, lutetium, titanium or calcium. The average valence of cobalt contained in each of the coating layers was determined by iodometric titration method to be 3.2 to 3.4.

These particulate active materials were used to produce nickel positive electrodes with a theoretical capacity of 1300 mAh, and eventually cylindrical sealed batteries in the same manner as EXAMPLE 1. Battery using the particulate active material having a coating layer comprising cobalt oxide containing ytterbium, lutetium, titanium or calcium was referred to as (B), (C), (D) or (E).

COMPARATIVE EXAMPLE 1

Solid solution nickel hydroxide particles having a coating layer comprising pure cobalt hydroxide were prepared in the same manner as EXAMPLE 1, except that, in step 2, an aqueous solution containing only cobalt sulfate with a concentration of 2.4 mol/L was employed, instead of a mixed aqueous solution E of cobalt sulfate and yttrium sulfate. The amount of pure cobalt hydroxide to be deposited on the surface of the solid solution nickel hydroxide particles was 10 wt % of the amount of the solid solution nickel hydroxide particles. Thus obtained particles having a coating layer comprising pure cobalt hydroxide had a spherical shape, a mean particle size of 10 μm and a tap density of 2.0 g/cm$^3$.

Then, the particles having a coating layer comprising pure cobalt hydroxide were subjected to the same oxidation treatment as EXAMPLE 1 to obtain a particulate active material having a coating layer comprising cobalt oxide. The average valence of cobalt in the coating layer was determined by iodometric titration method to be 3.2.

This particulate active material was used to produce a nickel positive electrode with a theoretical capacity of 1300 mAh, and eventually a cylindrical sealed battery (F) in the same manner as EXAMPLE 1.

COMPARATIVE EXAMPLE 2

A nickel positive electrode with a theoretical capacity of 1300 mAh and a cylindrical sealed battery (G) were produced in the same manner as EXAMPLE 1 except that the particulate active material having a coating layer comprising cobalt oxide prepared in COMPARATIVE EXAMPLE 1 was used, and that 1 g of yttrium oxide (Y$_2$O$_3$) particles per 100 g of the particulate active material was added to the positive electrode paste.

[Battery Evaluation 1]

The characteristics of the cylindrical sealed batteries (A) to (G) produced in EXAMPLES 1 to 5 and COMPARATIVE EXAMPLES 1 and 2 were evaluated.

Each battery was charged at a current of 130 mA for 15 hours at a temperature of 20° C. and discharged at a current of 260 mA to a battery voltage of 1.0 V at a temperature of 20° C. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C.; thereafter, average discharge voltage and active material utilization rate A1(after charge at 20° C.) were calculated.

In the next cycle, each battery was charged at 1.3 A for 1.2 hours at 45° C. and discharged at 1.3 A to a battery voltage of 0.8 V at 20° C. to measure discharge capacity; thereafter, active material utilization rate B1 (after charge at 45° C.) was calculated from that discharge capacity.

The active material utilization rate was determined by calculating the percentage of the discharge capacity relative to the theoretical electrical capacity determined based on the premise that nickel in the particulate active material undergoes one-electron reaction. The results are shown in Table 1.

TABLE 1

| Battery | Active material utilization rate | | Discharge voltage in charge/discharge at 20° C. |
|---|---|---|---|
| | A1 (charged at 20° C.) | B1 (charged at 45° C.) | |
| (A) | 93% | 75% | 1.250 V |
| (B) | 93% | 75% | 1.250 V |
| (C) | 94% | 76% | 1.249 V |
| (D) | 92% | 74% | 1.247 V |
| (E) | 92% | 76% | 1.247 V |
| (F) | 90% | 52% | 1.246 V |
| (G) | 92% | 61% | 1.240 V |

As is apparent from Table 1, the batteries (A) to (E) using the particulate active materials having a coating layer comprising cobalt oxide containing yttrium, ytterbium, lutetium, titanium and calcium, respectively, demonstrated significantly improved charge efficiencies at a high temperature as compared to the batteries (F) and (G). The battery (G) having a positive electrode with yttrium oxide powder added also exhibited an improved charge efficiency, but its charge efficiency was considerably lower than that of the batteries (A) to (E).

The batteries (A) to (E) had oxygen generating overvoltages at the end of charging about 25 mV higher than the battery (F) and about 10 mV higher than the battery (G).

The batteries (A) to (G) exhibited significantly high discharge voltages because they used the solid solution nickel hydroxide particles containing 10 mol % of magnesium relative to the total amount of metal elements. The battery (G) produced in COMPARATIVE EXAMPLE 2, however, showed a slightly lower discharge voltage. This is because the addition of yttrium oxide particles, which acts almost as an insulator, to the positive electrode increases the resistance of the positive electrode. Accordingly, the coating layers comprising cobalt oxide preferably contain an element such as yttrium.

EXAMPLE 6

Particulate active materials were prepared in the same manner as EXAMPLE 1, except that, in step 2, the amount of cobalt hydroxide containing yttrium to be deposited on the surface of the solid solution nickel hydroxide particles was varied in the range of 2 to 18 wt % of that of the solid solution nickel hydroxide particles. The obtained particles having a coating layer comprising cobalt oxide had a spherical shape, a mean particle size of 10 to 11 μm and a tap density of 1.8 to 2.0 g/cm$^3$. The amount of yttrium contained in the cobalt hydroxide was 10 mol % of the total amount of cobalt and yttrium.

Then, the particles having a coating layer comprising cobalt hydroxide containing yttrium were subjected to the same oxidation treatment as EXAMPLE 1 to obtain particulate active materials having a coating layer comprising cobalt oxide containing yttrium. The average valence of cobalt contained in the coating layers was determined by iodometric titration method to be 3.3 to 3.4.

These particulate active materials were used to produce nickel positive electrodes with a theoretical capacity of 1300 mAh, and eventually cylindrical sealed batteries in the same manner as EXAMPLE 1.

[Battery Evaluation 2]

The characteristics of the cylindrical sealed batteries produced in EXAMPLE 6 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A2 (during discharge at 1.3 A) was calculated from that discharge capacity.

In the next cycle, each battery was charged at 1.3 A for 1.2 hours at 20° C. and discharged at 4 A to a battery voltage of 0.6 V at 20° C. to measure discharge capacity; thereafter, active material utilization rate B2 (during discharge at 4 A) was calculated from that discharge capacity.

In addition, the ratio of the active material utilization rate: B2/A2 was calculated as an index of high-rate discharge characteristic.

Figure 1:
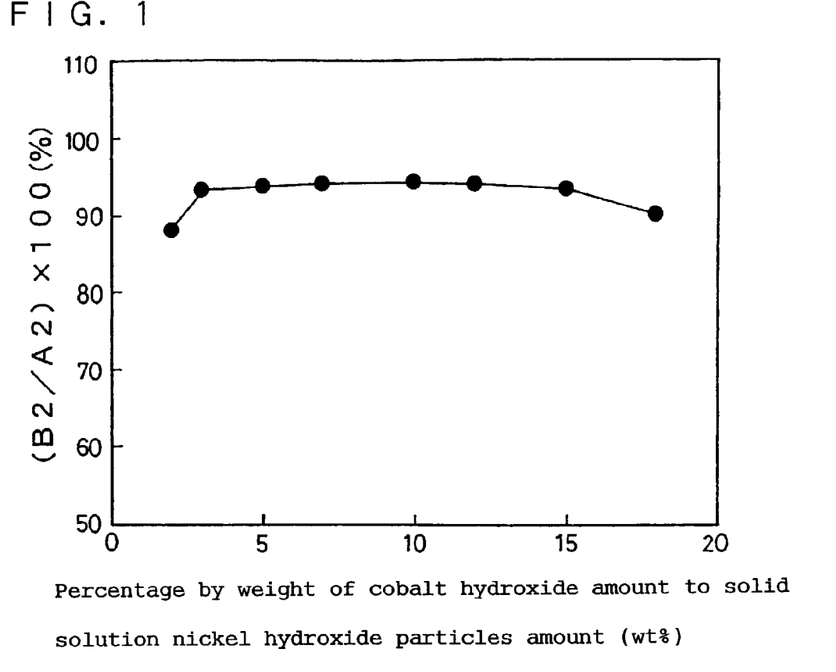
FIG. 1 is a graph showing a relationship, obtained using batteries of EXAMPLE 6 of the present invention, between the percentage by weight of the amount of cobalt hydroxide to the amount of the solid solution nickel hydroxide particles carrying the cobalt hydroxide and the ratio of the active material utilization rate: (B2/A2)×100(%).

FIG. 1 shows a relationship between the percentage of the amount of cobalt hydroxide to the amount of the solid solution nickel hydroxide particles carrying the cobalt hydroxide and the ratio of the active material utilization rate: (B2/A2)×100(%).

It is evident from FIG. 1 that the ratio of the active material utilization rate: B2/A2 is high when the coating layer percentage is in the range of 3 wt % to 15 wt % to the amount of the solid solution nickel hydroxide particles. Therefore, the coating layer percentage is preferably not smaller than 3 wt % and not larger than 15 wt % in order to enhance high-rate discharge characteristic.

Incidentally, an example of using the coating layer containing yttrium was given here, but the similar tendencies were observed even when the solid solution nickel hydroxide particles containing magnesium with other coating layer comprising cobalt oxide containing at least one selected from the group consisting of yttrium, ytterbium, lutetium, titanium and calcium were used.

EXAMPLE 7

Particulate active materials were prepared in the same manner as EXAMPLE 1, except that, in step 2, the concentration ratio of cobalt sulfate to yttrium sulfate was varied while the total concentration of cobalt sulfate and yttrium sulfate contained in the solution E was constant at 2.4 mol/L in order to change the amount of yttrium contained in the cobalt hydroxide in the range of 0 to 25 mol % of the total amount of cobalt and yttrium. The amount of cobalt hydroxide containing yttrium to be deposited on the surface of the solid solution nickel hydroxide particles was 10 wt % of the amount of the solid solution nickel hydroxide particles. The obtained particles having a coating layer comprising cobalt hydroxide had a spherical shape, a mean particle size of 10 to 11 μm and a tap density of 1.8 to 1.9 g/cm³.

Then, the particles having a coating layer comprising cobalt hydroxide containing yttrium were subjected to the same oxidation treatment as EXAMPLE 1 to obtain particulate active materials having a coating layer comprising cobalt oxide containing yttrium. The average valence of cobalt contained in the coating layers was determined by iodometric titration method to be 3.2 to 3.4.

These particulate active materials were used to produce nickel positive electrodes with a theoretical capacity of 1300 mAh, and eventually cylindrical sealed batteries in the same manner as EXAMPLE 1.

[Battery Evaluation 3]

The characteristics of the cylindrical sealed batteries produced in EXAMPLE 7 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A3 (after charge at 20° C., during discharge at 1.3 A) was calculated from that discharge capacity.

In the next cycle, each battery was charged at 1.3 A for 1.2 hours at 45° C. and discharged at 1.3 A to a battery voltage of 0.8 V at 20° C. to measure discharge capacity; thereafter, active material utilization rate B3 (after charge at 45° C.) was calculated from that discharge capacity.

In the further next cycle, each battery was charged at 1.3 A for 1.2 hours at 20° C. and discharged at 4 A to a battery voltage of 0.6 V at 20° C. to measure discharge capacity; thereafter, active material utilization rate C3 (during discharge at 4 A) was calculated from that discharge capacity.

In addition, the ratio of the active material utilization rate: B3/A3 was calculated as an index of high temperature charge efficiency, and the ratio of the active material utilization rate: C3/A3 was calculated as an index of high-rate discharge characteristic.

Figure 2:
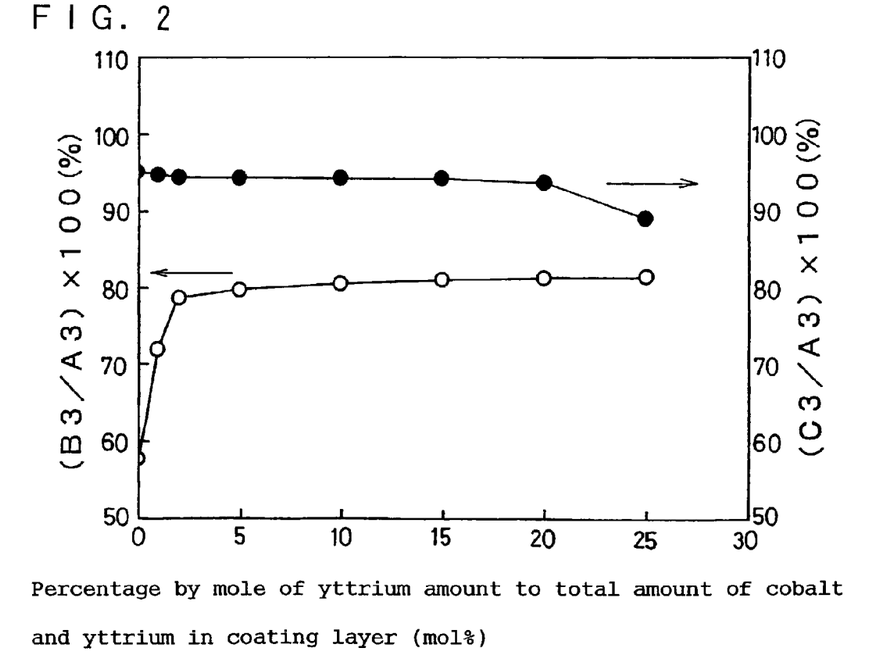
FIG. 2 is a graph showing a relationship between the percentage by mole of the amount of yttrium to the total amount of cobalt and yttrium contained in the cobalt hydroxide and the ratio of the active material utilization rate: (B3/A3)×100(%), or (C3/A3)×100(%), both ratios obtained using batteries of EXAMPLE 7 of the present invention.

FIG. 2 shows relationships between the percentage by mole of the amount of yttrium to the total amount of cobalt and yttrium contained in the cobalt hydroxide and the ratio of the active material utilization rate: (B3/A3)×100(%), and between the percentage by mole of the amount of yttrium to the total amount of cobalt and yttrium contained in the cobalt hydroxide and the ratio of the active material utilization rate: (C3/A3)×100(%). It is evident from FIG. 2 that when the amount of yttrium is 2 mol % or more, the ratio of the active material utilization rate: B3/A3 is high, whereas when the amount of yttrium is 20 mol % or less, the ratio of the active material utilization rate: C3/A3 is high. Accordingly, in order to enhance the high temperature charge efficiency and the high-rate discharge characteristic, the amount of yttrium is preferably not smaller than 2 mol % and not larger than 20 mol % of the total amount of metal elements contained in the coating layer.

Incidentally, an example of using the coating layer containing yttrium was given here, but the similar tendencies were observed even when the solid solution nickel hydroxide particles containing magnesium with other coating layer comprising cobalt oxide containing at least one selected from the group consisting of yttrium, ytterbium, lutetium, titanium and calcium were used.

EXAMPLE 8

Particulate active materials were prepared in the same manner as EXAMPLE 1, except that, in step 2, the concentration of the aqueous solution of potassium hydroxide and the oxidation time were changed when the particles having a coating layer comprising cobalt hydroxide containing yttrium were subjected to the oxidation treatment. The average valence of cobalt in the coating layers comprising cobalt oxide was determined by iodometric titration method to be 2.57 to 3.48.

These particulate active materials were used to produce nickel positive electrodes with a theoretical capacity of 1300 mAh, and eventually cylindrical sealed batteries in the same manner as EXAMPLE 1.

[Battery Evaluation 4]

The characteristics of the cylindrical sealed batteries produced in EXAMPLE 8 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A4 (after charge at 20° C., during discharge at 1.3 A) was calculated from that discharge capacity.

In the next cycle, each battery was charged at 1.3 A for 1.2 hours at 20° C. and discharged at 4 A to a battery voltage of 0.6 V at 20° C. to measure discharge capacity; thereafter, active material utilization rate B4 (during discharge at 4 A) was calculated from that discharge capacity.

In addition, the ratio of the active material utilization rate: B4/A4 was calculated as an index of high-rate discharge characteristic.

Figure 3:
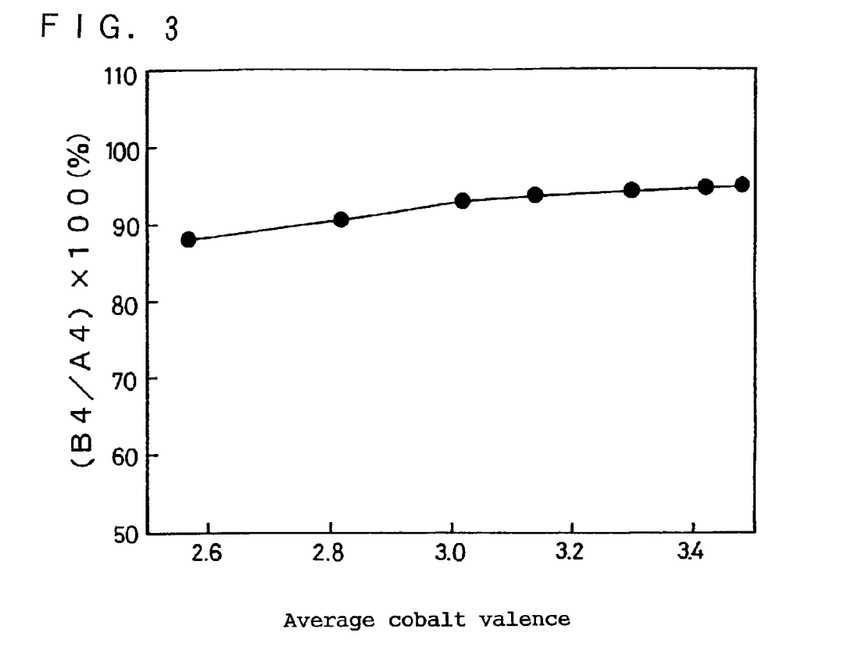
FIG. 3 is a graph showing a relationship, obtained using batteries of EXAMPLE 8 of the present invention, between the average valence of cobalt contained in the coating layer comprising cobalt oxide and the ratio of the active material utilization rate: (B4/A4)×100(%).

FIG. 3 shows a relationship between the average valence of cobalt contained in the coating layers comprising cobalt oxide and the ratio of the active material utilization rate: (B4/A4)×100(%).

It is evident from FIG. 3 that the ratio of the active material utilization rate: B4/A4 is high when the average cobalt valence is greater than 3. Accordingly, in order to further enhance the high-rate discharge characteristic, the average valence of cobalt contained in the coating layers is preferably greater than 3.

Incidentally, an example of using the coating layer containing yttrium was given here, but the similar tendencies were observed even when the solid solution nickel hydroxide particles containing magnesium with other coating layer comprising cobalt oxide containing at least one selected from the group consisting of yttrium, ytterbium, lutetium, titanium and calcium were used.

EXAMPLE 9

Solid solution nickel hydroxide particles containing different amounts of magnesium were prepared in the same manner as EXAMPLE 1 except that, in step 1, the concentration ratio of nickel sulfate to magnesium sulfate was varied in the range of 99.5:0.5 to 80:20 in molar ratio while the total concentration of nickel sulfate and magnesium sulfate contained in the solution A was constant at 2.4 mol/L. The obtained solid solution nickel hydroxide particles containing magnesium had a spherical shape and a mean particle size of 10 μm.

The magnesium-containing solid solution nickel hydroxide particles obtained above were analyzed to determine its composition. The following shows the result.

The amount of magnesium contained in the solid solution nickel hydroxide particles was 0.5 to 20 mol % of the total amount of the metal elements contained in the solid solution nickel hydroxide particles.

The amount of sulfate ions contained in the solid solution nickel hydroxide particles were 0.28 to 0.45 wt %.

The solid solution nickel hydroxide particles were confirmed to be composed of $\beta$-Ni(OH)$_2$ type single phase by X-ray diffraction pattern obtained using CuK$\alpha$ radiation. That is to say, it was confirmed that part of nickel atoms constituting nickel hydroxide crystals were replaced with magnesium atoms to form a solid solution.

The BET specific surface area of the solid solution nickel hydroxide particles measured by nitrogen gas adsorption was 8 to 20 m$^2$/g.

Particulate active materials were prepared in the same manner as EXAMPLE 1 except that the aforesaid powders were used. The average valence of cobalt in the coating layers comprising cobalt oxide was determined by iodometric titration method to be 3.3 to 3.4.

These particulate active materials were used to prepare nickel positive electrodes with a theoretical capacity of 1300 mAh, and eventually cylindrical sealed batteries in the same manner as EXAMPLE 1.

[Battery Evaluation 5]

The characteristics of the cylindrical sealed batteries produced in EXAMPLE 9 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate was calculated from that discharge capacity and the average discharge voltage was also determined.

Figure 4:
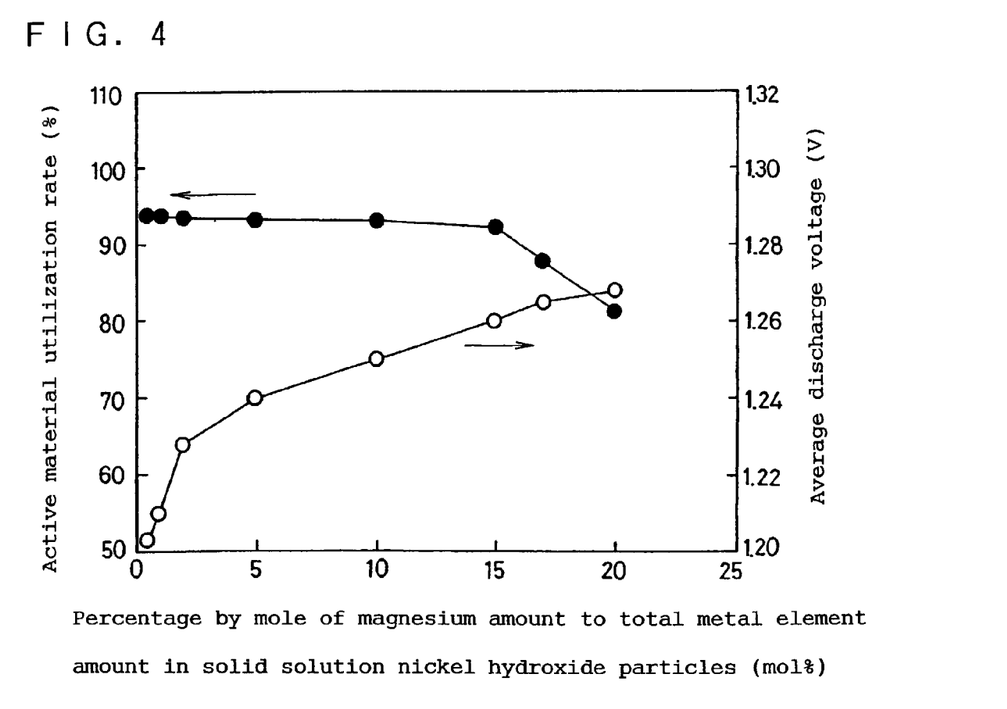
FIG. 4 is a graph showing a relationship between the percentage by mole of the amount of magnesium to the total amount of metal elements contained in the solid solution nickel hydroxide particles and the active material utilization rate, or average discharge voltage, both obtained using batteries of EXAMPLE 9 of the present invention.

FIG. 4 shows relationships between the percentage by mole of the amount of magnesium to the total amount of metal elements contained in the solid solution nickel hydroxide particles and the active material utilization rate, and between the percentage by mole of the amount of magnesium to the total amount of metal elements contained in the solid solution nickel hydroxide particles and the average discharge voltage.

It is apparent from FIG. 4 that the average discharge voltage is significantly increased when the amount of magnesium contained in the solid solution nickel hydroxide particles is 2 mol % or more. It is also evident that, when the amount of magnesium is greater than 15 mol %, the active material utilization rate tends to be low. Accordingly, the amount of magnesium is preferably not smaller than 2 mol % and not larger than 15 mol % of the total amount of metal elements in the solid solution nickel hydroxide particles.

It should be noted that, when the content of magnesium was 2 to 15 mol %, it was possible to produce a positive electrode with an excellent high temperature charge efficiency in the same manner as Example 1 by adding yttrium into the coating layers comprising cobalt oxide.

Incidentally, an example of using the coating layer containing yttrium was given here, but the similar tendencies were observed even when the solid solution nickel hydroxide particles containing magnesium with other coating layer comprising cobalt oxide containing at least one selected from the group consisting of yttrium, ytterbium, lutetium, titanium and calcium were used.

EXAMPLE 10

Solid solution nickel hydroxide particles containing magnesium were prepared in the same manner as EXAMPLE 1 except that the concentration of ammonia contained in the solution C was varied in the range of 3 to 7 mol/L in order to change a specific surface area of the solid solution nickel hydroxide particles. The higher the ammonia concentration was, the higher the solubility of nickel into the aqueous solution in the reactor was; thus, the growth of the hydroxide particles was slowed. The obtained solid solution nickel hydroxide particles containing magnesium had a spherical shape and a mean particle size of 8 to 11 μm.

The magnesium-containing solid solution nickel hydroxide particles obtained above were analyzed to determine its composition. The following shows the result.

The amount of magnesium contained in the solid solution nickel hydroxide particles was 10 mol % of the total amount of the metal elements contained in the solid solution nickel hydroxide particles.

The amount of sulfate ions contained in the solid solution nickel hydroxide particles was 0.22 to 0.48 wt %.

The solid solution nickel hydroxide particles were confirmed to be composed of β-Ni(OH)$_2$ type single phase by X-ray diffraction pattern obtained using CuKα radiation. That is to say, it was confirmed that part of nickel atoms constituting nickel hydroxide crystals were replaced with magnesium atoms in the solid solution.

The BET specific surface area of the solid solution nickel hydroxide particles measured by nitrogen gas adsorption was 4 to 20 m$^2$/g.

Then, the coating layer comprising cobalt hydroxide containing yttrium was formed on the surface of the obtained solid solution nickel hydroxide particles in the same manner as step 2 of EXAMPLE 1. In this case, the following tendency was observed: the larger the BET specific surface area of the solid solution nickel hydroxide particles was, the more unevenly the coating layer of cobalt hydroxide grew, to produce bulky powders. When the BET specific surface area was greater than 15 m$^2$/g, the tap density fell below 1.7 g/cm$^3$.

The similar tendencies were observed when other coating layers comprising cobalt hydroxide containing at least one selected from the group consisting of yttrium, ytterbium, lutetium, titanium and calcium were used.

Then, the coating layer comprising cobalt hydroxide containing yttrium was subjected to the same oxidation treatment as EXAMPLE 1 to be oxidized to the coating layer comprising cobalt oxide so as to obtain a particulate active material. The average valence of cobalt contained in the coating layer comprising cobalt oxide was determined by iodometric titration method to be 3.2 to 3.4.

These particulate active materials were used to prepare nickel positive electrodes with a theoretical capacity of 1300 mAh, and eventually cylindrical sealed batteries in the same manner as EXAMPLE 1.

[Battery Evaluation 6]

The characteristics of the cylindrical sealed batteries produced in EXAMPLE 10 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A5 (after charge at 20° C., during discharge at 1.3 A) was calculated from that discharge capacity.

In the next cycle, each battery was charged at 1.3 A for 1.2 hours at 20° C. and discharged at 4 A to a battery voltage of 0.6 V at 20° C. to measure discharge capacity; thereafter, active material utilization rate B5 (during discharge at 4 A) was calculated from that discharge capacity.

In addition, the ratio of the active material utilization rate: B5/A5 was calculated as an index of high-rate discharge characteristic.

Figure 5:
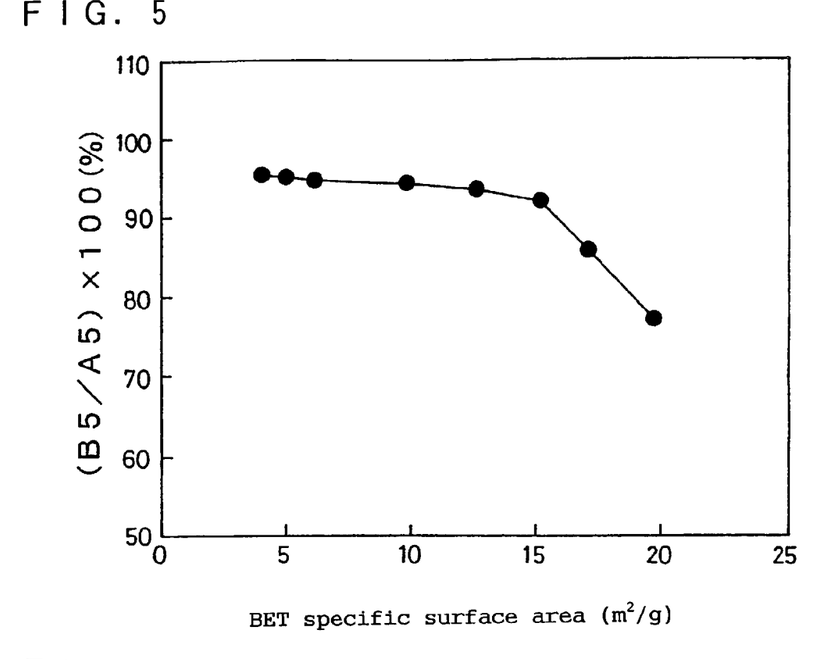
FIG. 5 is a graph showing a relationship, obtained using batteries of EXAMPLE 10 of the present invention, between the BET specific surface area of the solid solution nickel hydroxide particles and the ratio of the active material utilization rate: (B5/A5)×100 (%).

FIG. 5 shows a relationship between the BET specific surface area of the solid solution nickel hydroxide particles and the ratio of the active material utilization rate: (B5/A5)× 100 (%).

It is apparent from FIG. 5 that, when the BET specific surface area of the solid solution nickel hydroxide particles is not smaller than 5 m$^2$/g and not larger than 15 m$^2$/g, the ratio of the active material utilization rate: B5/A5 is high. Accordingly, the BET specific surface area of the solid solution nickel hydroxide particles measured by nitrogen gas adsorption should be not smaller than 5 m$^2$/g and not larger than 15 m$^2$/g in order to enhance the high-rate discharge characteristic. When the BET specific surface area was less than 5 m$^2$/g, the active material utilization rate tended to be low due to the reduction in the reaction area.

EXAMPLE 11

Solid solution nickel hydroxide particles containing magnesium were prepared in the same manner as EXAMPLE 1 except that the immersion time and the number of the immersion treatment were changed, when the hydroxide obtained by decantation was immersed in an aqueous solution D of sodium hydroxide with a pH of 13 to 14 in step 1, so as to control the amount of sulfate ions contained in the nickel hydroxide particles. The obtained particles had a spherical shape and a mean particle size of 10 μm.

The amount of sulfate ions contained in the solid solution nickel hydroxide particles was 0.20 to 0.85 wt %.

The solid solution nickel hydroxide particles were confirmed to be composed of β-Ni(OH)$_2$ type single phase by X-ray diffraction pattern obtained using CuKα radiation. That is to say, it was confirmed that part of nickel atoms constituting nickel hydroxide crystals were replaced with magnesium atoms in the solid solution.

The BET specific surface area of the solid solution nickel hydroxide particles measured by nitrogen gas adsorption was 9 to 10 m$^2$/g.

Particulate active materials were prepared in the same manner as EXAMPLE 1, except that the aforementioned powders were used. The average valence of cobalt contained in the coating layer comprising cobalt oxide was determined by iodometric titration method to be 3.2 to 3.4.

These particulate active materials were used to produce nickel positive electrodes with a theoretical capacity of 1300 mAh, and eventually cylindrical sealed batteries in the same manner as EXAMPLE 1.

[Battery Evaluation 7]

The characteristics of the cylindrical sealed batteries produced in EXAMPLE 11 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A6 (after charge at 20° C., during discharge at 1.3 A) was calculated from that discharge capacity.

In the next cycle, each battery was charged at 1.3 A for 1.2 hours at 20° C. and discharged at 4 A to a battery voltage of 0.6 V at 20° C. to measure discharge capacity; thereafter, active material utilization rate B6 (during discharge at 4 A) was calculated from that discharge capacity.

In addition, the ratio of the active material utilization rate: B6/A6 was calculated as an index of high-rate discharge characteristic.

Figure 6:
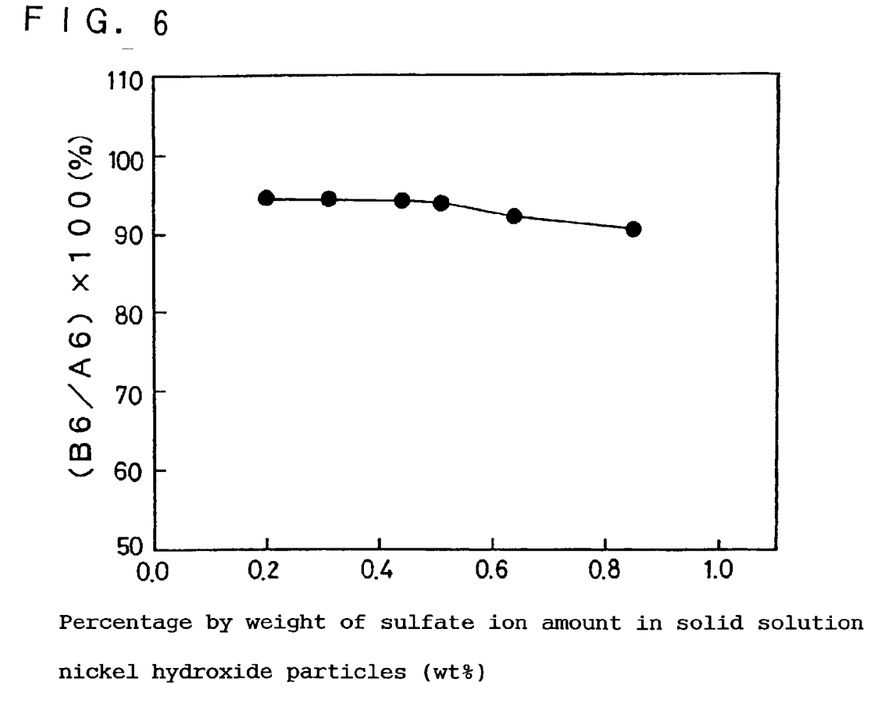
FIG. 6 is a graph showing a relationship, obtained using batteries of EXAMPLE 11 of the present invention, between the percentage by weight of the amount of sulfate ions contained in the solid solution nickel hydroxide particles and the ratio of the active material utilization rate: (B6/A6)×100 (%).

FIG. 6 shows a relationship between the percentage by weight of the amount of sulfate ions contained in the solid solution nickel hydroxide particles and the ratio of the active material utilization rate:(B6/A6)×100 (%).

It is apparent from FIG. 6 that the ratio of the active material utilization rate: B6/A6 is high when the amount of sulfate ions in the solid solution nickel hydroxide particles is 0.5 wt % or less. Accordingly, the amount of sulfate ions in the solid solution nickel hydroxide particles is preferably 0.5 wt % or less in order to enhance the high-rate discharge characteristic.

EXAMPLE 12

Solid solution nickel hydroxide particles containing magnesium and cobalt were prepared in the same manner as EXAMPLE 1, except that, in step 1, cobalt sulfate was added to the solution A of nickel sulfate and magnesium sulfate, and that the concentration ratio of magnesium sulfate to cobalt sulfate was varied in the range of 100:0 to 60:40 while the total concentration of nickel sulfate, magnesium sulfate and cobalt sulfate was constant at 2.4 mol/L and the concentration ratio of nickel sulfate to the total of magnesium sulfate and cobalt sulfate was 90:10 in molar ratio. The obtained solid solution nickel hydroxide particles containing magnesium and cobalt had a spherical shape and a mean particle size of 10 μm.

The solid solution nickel hydroxide particles containing magnesium and cobalt were analyzed to determine its composition. The following shows the result.

The amount of magnesium and cobalt contained in the solid solution nickel hydroxide particles was proportionate to the concentration ratio of sulfate salt in the aqueous solution.

The amount of sulfate ions contained in the solid solution nickel hydroxide particles was 0.5 wt % or less.

The solid solution nickel hydroxide particles were confirmed to be composed of β-Ni(OH)$_2$ type single phase by X-ray diffraction pattern obtained using CuKα radiation. That is to say, it was confirmed that part of nickel atoms constituting nickel hydroxide crystals were replaced with magnesium atoms or cobalt atoms in the solid solution.

The BET specific surface area of the solid solution nickel hydroxide particles measured by nitrogen gas adsorption was 9 to 10 m$^2$/g.

Particulate active materials were prepared in the same manner as EXAMPLE 1 except that the aforesaid powders were used. The average valence of cobalt in the coating layers comprising cobalt oxide was determined by iodometric titration method to be 3.1 to 3.4.

These particulate active materials were used to prepare nickel positive electrodes with a theoretical capacity of 1300 mAh, and eventually cylindrical sealed batteries in the same manner as EXAMPLE 1.

[Battery Evaluation 8]

The characteristics of the cylindrical sealed batteries produced in EXAMPLE 12 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A7 (after charge at 20° C., during discharge at 1.3 A) was calculated from that discharge capacity.

In the next cycle, each battery was charged at 1.3 A for 1.2 hours at 20° C. and discharged at 4 A to a battery voltage of 0.6 V at 20° C. to measure discharge capacity; thereafter, active material utilization rate B7 (during discharge at 4 A) was calculated from that discharge capacity.

In addition, the ratio of the active material utilization rate: B7/A7 was calculated as an index of high-rate discharge characteristic.

As a result, it was found that the addition of cobalt to the solid solution nickel hydroxide particles other than magnesium improved the charge efficiency, as well as the output characteristic and the high-rate discharge characteristic due to the addition of magnesium.

When the amount of cobalt contained in the solid solution nickel hydroxide particles was less than 0.5 mol % of the total amount of metal elements, the effect of improving the charge efficiency was poor. On the other hand, when it was greater than 3 mol %, the discharge voltage was slightly reduced. Accordingly, the amount of cobalt contained in the solid solution nickel hydroxide particles is preferably not smaller than 0.5 mol % and not larger than 3 mol % of the total amount of metal elements.

Incidentally, an example of using solid solution nickel hydroxide particles containing magnesium and cobalt was given here, but the similar tendencies were observed even when the solid solution nickel hydroxide particles containing magnesium and manganese, that were obtained by using manganese sulfate instead of cobalt sulfate, were used.

EXAMPLE 13

A cylindrical sealed battery was produced in the same manner as EXAMPLE 1, except that, in step 4, an alkaline aqueous electrolyte containing 5.5 mol/L of potassium hydroxide and 1.5 mol/L of lithium hydroxide while the total concentration was 7 mol/L was used as the electrolyte.

[Battery Evaluation 9]

The characteristics of the cylindrical sealed battery produced in EXAMPLE 13 were evaluated.

At a temperature of 20° C., the battery was charged at a current of 130 mA for 15 hours and discharged at a current of 260 mA to a battery volume of 1.0 V. This charge/discharge cycle was repeated until the discharge capacity became stable.

Subsequently, the battery was charged at 1.3 A for 1.2 hours at 20° C. and discharged at 1.3 A to a battery voltage of 0.8 V at 20° C. to measure discharge capacity; thereafter, active material utilization rate A8 (after charge at 20° C.) was calculated from that discharge capacity.

In the next cycle, the battery was charged at 1.3 A for 1.2 hours at 45° C. and discharged at 1.3 A to a battery voltage of 0.8 V at 20° C. to measure discharge capacity; thereafter, active material utilization rate B8 (after charge at 45° C.) was calculated from that discharge capacity.

In the further next cycle, the battery was charged at 1.3 A for 1.2 hours at 20° C. and discharged at 4 A to a battery voltage of 0.6 V at 20° C. to measure discharge capacity; thereafter, active material utilization rate C8 (during discharge at 4 A) was calculated from that discharge capacity.

As a result, the active material utilization rate A8 obtained after the battery was charged at 20° C. was 91.5%, which was the same as that of EXAMPLE 1, whereas the active material utilization rate B8 obtained after the battery was charged at 45° C. was 79.1%, which indicated a significant improvement in the high temperature charge efficiency. Further, it was confirmed that the active material utilization rate C8 obtained when the battery was discharged at 4 A was 85.3%, which exhibited superior high-rate discharge characteristic.

EXAMPLE 14

Cylindrical sealed batteries were produced in the same manner as EXAMPLE 13, except that the concentration ratio of potassium hydroxide and lithium hydroxide in the alkaline electrolyte was varied while the total concentration of alkali metal hydroxides was constant at 7 mol/L.

To be more specific, the amount of lithium hydroxide contained in the alkaline electrolyte was varied in the range of 0 to 28 mol % of the total amount of the alkali metal hydroxides contained in the alkaline electrolyte.

[Battery Evaluation 10]

The characteristics of the cylindrical sealed batteries produced in EXAMPLE 14 were evaluated.

At a temperature of 20° C., each battery was charged at a current of 130 mA for 15 hours and discharged at a current of 260 mA to a battery voltage of 1.0 V. This charge/discharge cycle was repeated until the discharge capacity became stable.

Subsequently, each battery was charged at 1.3 A for 1.2 hours at 20° C. and discharged at 1.3 A to a battery voltage of 0.8 V at 20° C. to measure discharge capacity; thereafter, active material utilization rate A9 (after charge at 20° C., during discharge at 1.3 A) was calculated from that discharge capacity.

In the next cycle, each battery was charged at 1.3 A for 1.2 hours at 45° C. and discharged at 1.3 A to a battery voltage of 0.8 V at 20° C. to measure discharge capacity; thereafter, active material utilization rate B9 (after charge at 45° C.) was calculated from that discharge capacity.

In the further next cycle, each battery was charged at 1.3 A for 1.2 hours at 20° C. and discharged at 4 A to a battery voltage of 0.6 V at 20° C. to measure discharge capacity; thereafter, active material utilization rate C9 (during discharge at 4 A) was calculated from that discharge capacity.

In addition, the ratio of the active material utilization rate: B9/A9 was calculated as an index of high temperature charge efficiency, and the ratio of the active material utilization rate: C9/A9 was calculated as an index of high-rate discharge characteristic.

Figure 7:
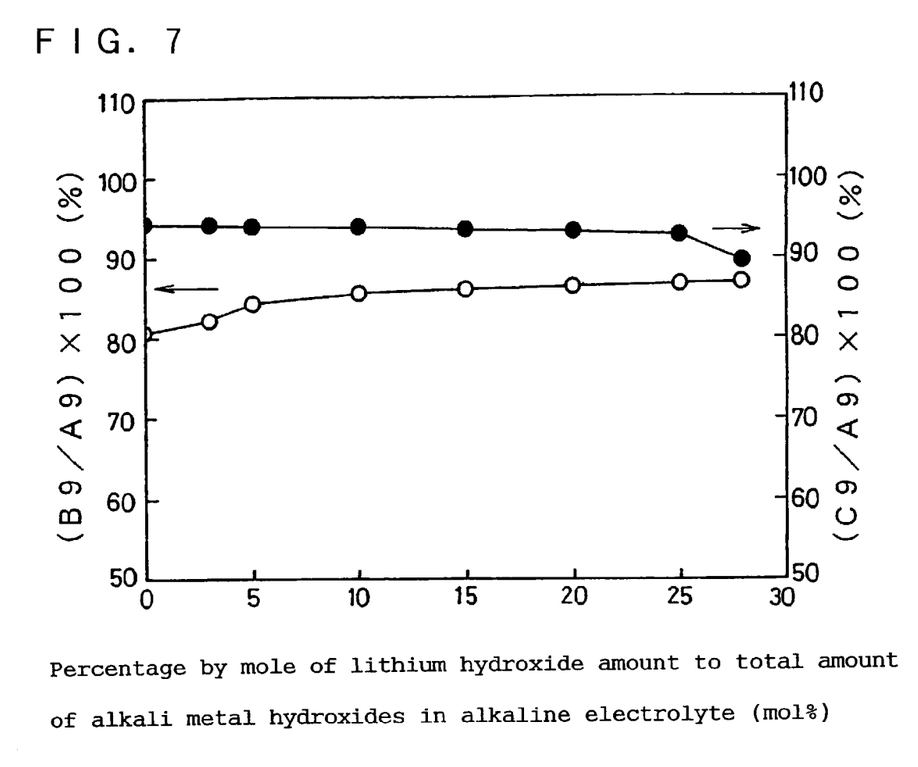
FIG. 7 is a graph showing a relationship between the percentage by mole of the amount of lithium hydroxide to the total amount of alkali metal hydroxides contained in the alkaline electrolyte and the ratio of the active material utilization rate: (B9/A9)×100, or (C9/A9)×100, both ratios obtained using batteries of EXAMPLE 14 of the present invention.

FIG. 7 shows relationships between the percentage by mole of the amount of lithium hydroxide contained in the electrolyte to the total amount of alkali metal hydroxides contained in the electrolyte and the ratio of the active material utilization rate: (B9/A9)×100, and between the percentage by mole of the amount of lithium hydroxide contained in the electrolyte to the total amount of alkali metal hydroxides contained in the electrolyte and the ratio of the active material utilization rate: (C9/A9)×100.

It is apparent from FIG. 7 that when the amount of lithium hydroxide contained in the electrolyte was 5 mol % or more of the total amount of alkali metal hydroxide, the ratio of the active material utilization rate: B9/A9 was high, whereas when it was 25 mol % or less, the ratio of the active material utilization rate: C9/A9 was high. Accordingly, in order to enhance the high temperature charge efficiency and the high-rate discharge characteristic, the amount of lithium hydroxide contained in the electrolyte is preferably not smaller than 5 mol % and not larger than 25 mol % of the total amount of the alkali metal hydroxides contained in the electrolyte.

Then, the same evaluation was carried out, except that the total concentration of the alkali metal hydroxides contained in the electrolyte was varied. As a result, when the total concentration of the alkali metal hydroxides contained in the electrolyte was less than 5 mol/L and greater than 9 mol/L, the active material utilization rate during high rate discharge (during discharge at 4 A) was significantly decreased. Accordingly, in order to enhance the high-rate discharge characteristic, the total concentration of the alkali metal hydroxides contained in the electrolyte is preferably 5 mol/L to 9 mol/L.

Incidentally, an example of using the electrolyte containing potassium hydroxide and lithium hydroxide was given here, but the similar tendencies were observed even when the electrolyte further contained sodium hydroxide.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A particulate positive electrode active material for an alkaline storage battery comprising:
  (a) solid solution nickel hydroxide particles containing at least magnesium,
  the amount of magnesium contained in said solid solution nickel hydroxide particles being not smaller than 2 mol % and not larger than 15 mol % of the total amount of metal elements contained in said solid solution nickel hydroxide particles,
  BET specific surface area of said solid solution nickel hydroxide particles measured by nitrogen gas adsorption being not smaller than 5 $m^2/g$ and not larger than 15 $m^2/g$, and
  (b) a coating layer comprising cobalt oxide formed on the surface of said solid solution nickel hydroxide particles, said coating layer further comprising at least one element "Xs" selected from the group consisting of yttrium, ytterbium, and lutetium, wherein an amount of said element "Xs" contained in said coating layer (b) is not smaller than 2 mol % and not larger than 20 mol % of the total amount of metal elements contained in said coating layer (b).

2. The particulate positive electrode active material for an alkaline storage battery in accordance with claim 1, wherein the amount of said coating layer (b) is not smaller than 3 wt % and not larger than 15 wt % of the amount of said solid solution nickel hydroxide particles (a).

3. The particulate positive electrode active material for an alkaline storage battery in accordance with claim 1, wherein the average valence of cobalt in said cobalt oxide is greater than 3.

4. The particulate positive electrode active material for an alkaline storage battery in accordance with claim 1, wherein said solid solution nickel hydroxide particles (a) contain sulfate ions in an amount of 0.5 wt % or less.

5. The particulate positive electrode active material for an alkaline storage battery in accordance with claim 1, wherein said solid solution nickel hydroxide particles (a) further comprise at least one element "Xc" selected from the group consisting of cobalt and manganese.

6. The particulate positive electrode active material for an alkaline storage battery in accordance with claim 5, wherein the amount of said element "Xc" contained in said solid solution nickel hydroxide particles (a) is not smaller than 0.5 mol % and not larger than 3 mol % of the total amount of metal elements contained in said solid solution nickel hydroxide particles (a).

7. A positive electrode for an alkaline storage battery comprising: a particulate positive electrode active material comprising
(a) solid solution nickel hydroxide particles containing at least magnesium,
the amount of magnesium contained in said solid solution nickel hydroxide particles being not smaller than 2 mol % and not larger than 15 mol % of the total amount of metal elements contained in said solid solution nickel hydroxide particles,
BET specific surface area of said solid solution nickel hydroxide particles measured by nitrogen gas adsorption being not smaller than 5 $m^2/g$ and not larger than 15 $m^2/g$, and
(b) a coating layer comprising cobalt oxide formed on the surface of said solid solution nickel hydroxide particles,
said coating layer further comprising at least one element "Xs" selected from the group consisting of yttrium, ytterbium, and lutetium, wherein an amount of said element "Xs" contained in said coating layer (b) is not smaller than 2 mol % and not larger than 20 mol % of the total amount of metal elements contained in said coating layer (b).

8. An alkaline storage battery comprising:
(1) a positive electrode comprising a particulate positive electrode active material;
(2) a negative electrode; and
(3) an alkaline electrolyte containing alkali metal ions;
said particulate positive electrode active material comprising
(a) solid solution nickel hydroxide particles containing at least magnesium,
the amount of magnesium contained in said solid solution nickel hydroxide particles being not smaller than 2 mol % and not larger than 15 mol % of the total amount of metal elements contained in said solid solution nickel hydroxide particles,
BET specific surface area of said solid solution nickel hydroxide particles measured by nitrogen gas adsorption being not smaller than 5 $m^2/g$ and not larger than 15 $m^2/g$, and
(b) a coating layer comprising cobalt oxide formed on the surface of said solid solution nickel hydroxide particles,
said coating layer further comprising at least one element "Xs" selected from the group consisting of yttrium, ytterbium, and lutetium, wherein an amount of said element "Xs" contained in said coating layer (b) is not smaller than 2 mol % and not larger than 20 mol % of the total amount of metal elements contained in said coating layer (b).

9. The alkaline storage battery in accordance with claim 8, wherein the concentration of said alkali metal ions contained in said alkaline electrolyte (3) is not smaller than 5 mol/L and not larger than 9 mol/L.

10. The alkaline storage battery in accordance with claim 8, wherein said alkali metal ions comprises lithium ions.

11. The alkaline storage battery in accordance with claim 10, wherein the amount of said lithium ions is not smaller than 5 mol % and not larger than 25 mol % of the total amount of said alkali metal ions.

* * * * *